US005833794A

United States Patent [19]

Mayer

[11] Patent Number: 5,833,794

[45] Date of Patent: Nov. 10, 1998

[54] AUTOMATED SLIDE MARKER USING A DRY PRESSURE SENSITIVE MARKING MEDIUM

[75] Inventor: William J. Mayer, South Barrington, Ill.

[73] Assignee: AccuMed International, Inc., Chicago, Ill.

[21] Appl. No.: 723,828

[22] Filed: Sep. 30, 1996

[51] Int. Cl.$^{6}$ .......................... B32B 31/00; G02B 21/34

[52] U.S. Cl. .......................... 156/261; 156/64; 156/353; 156/361; 156/378; 156/510; 156/518; 359/396

[58] Field of Search .......................... 156/64, 261, 353, 156/358, 361, 378, 510, 518, 520; 83/55, 211, 360, 370, 524, 684, 685, 686, 697; 226/11; 359/396

[56] References Cited

U.S. PATENT DOCUMENTS

| | | | |
|---|---|---|---|
| 3,912,360 | 10/1975 | Beckel . | |
| 4,196,254 | 4/1980 | Puskadi . | |
| 4,620,184 | 10/1986 | Nedstedt | 226/11 X |
| 4,683,023 | 7/1987 | Sokolovsky | 156/518 |
| 4,863,551 | 9/1989 | Ogura | 156/378 |
| 5,496,636 | 3/1996 | Gu et al. . | |
| 5,574,594 | 11/1996 | Fowler et al. | 359/391 |
| 5,740,270 | 4/1998 | Rutenberg et al. . | |

*Primary Examiner*—Curtis Mayes
*Attorney, Agent, or Firm*—McDonnell Boehnen Hulbert & Berghoff

[57] ABSTRACT

A slide marker that automatically makes a mark onto a predetermined location of a slide using a dry marking medium. A puncher during a full cycle of movement tamps a punched through portion of the marking medium onto the predetermined location of the slide with near zero contact velocity. The marking medium has a contact surface having a pressure sensitive adhesive such that the mark will remain securely on the predetermined location of the slide. A section of unused marking medium is spooled into a throat of a puncher guide that carries the puncher over the predetermined location on the slide. A controller and sensor automate the process of making a mark at a predetermined location of the puncher by limiting the movement of the puncher to one full cycle of movement when the puncher is over any predetermined location of the slide for marking. The controller and another sensor also monitor the supply level of the unused marking medium, and the controller warns the user when that supply level has diminished to a predetermined low level.

22 Claims, 1 Drawing Sheet

AUTOMATED SLIDE MARKER USING A DRY PRESSURE SENSITIVE MARKING MEDIUM

FIELD OF THE INVENTION

The present invention relates generally to slide markers and more particularly to a method and apparatus for automatically making a mark on a slide using a dry pressure sensitive marking medium.

BACKGROUND OF THE INVENTION

When viewing a magnified image of a slide, the viewer may often want to mark critical features on the slide. This marking may facilitate relocation of such critical features during later magnified viewing of the slide. For example, the AcCell™ Automated Cytology Work Station, manufactured by AccuMed International Inc. of Chicago, Ill. is a system for viewing of cells in a slide having a pap smear and for marking the cells that appear abnormal by a cytologist. Then a pathologist can later reexamine the marked cells to determine whether the marked cells are cancerous.

In the prior art, the marking of slides is done manually by scribing the critical locations of the slide with solvent based ink pens. Alternatively in the prior art, these markings are made manually with an elastomer type ink pad which includes a plunger having an ink blotter at the tip. The user of the elastomer type ink pad would manually push down the plunger such that a mark would be made on the slide by the ink blotter.

In either case of the prior art, a wet marking medium is used. Unfortunately, a wet marking medium is disadvantageous because a dry cycle is typically required. In addition, a wet marking medium is volatile and drys up once the package containing the wet marking medium has been opened and when the wet marking medium is not used. Although the solvent of the wet marking medium can be varied to extend the useful life of the wet marking medium, extending that useful life can also extend the time period of the dry cycle. Moreover, because the prior art slide markers are manually operated, such markings are labor intensive, slow, and the accuracy of the placement of the mark at the critical location can be poor depending on the skill of the operator making the marks.

OBJECTS OF THE INVENTION

An object of the present invention is to automate the process of making a mark on a critical location of a slide.

A related object of the present invention is to make the mark on the slide with minimal force such that the slide will not be damaged.

A further object of the present invention is to make the mark with a dry marking medium having a contact surface with a pressure sensitive adhesive.

A related object of the present invention is to automatically spool out an unused section of the marking medium over the critical location of the slide before a mark with that section of the marking medium is made at that location.

A further related object of the present invention is to monitor the spool of unused marking medium and to warn a user when the supply level of the unused marking medium is sufficiently low.

SUMMARY OF THE INVENTION

In a principle aspect, the present invention takes the form of an apparatus and a method for making a mark at a predetermined location of a slide. In accordance with the invention, a puncher makes a full cycle of a movement from a first position to a second position and back to the first position. The puncher has a punching surface which makes contact with the slide with a near zero contact velocity when the puncher is at the second position such that the slide is not damaged. Additionally, an unused section of a marking medium is advanced to be disposed between the puncher and the predetermined location on the slide. The marking medium has a contact surface with a pressure sensitive adhesive facing the slide. The mark is made then when the punching surface of the puncher tamps the marking medium onto the predetermined location of the slide when the puncher is at the second position during the cyclic movement of the puncher.

The marking medium may advantageously take the form of a dry marking medium that does not require a dry cycle. More specifically, the marking medium may take the form of a tinted polyester film stock.

Moreover, the cyclic movement of the puncher may advantageously be generated by the use of a motor, a shaft, an eccentric post, and a link. The motor would generate the rotational movement of the shaft, and the eccentric post and the link would then translate that rotational movement of the shaft to the cyclic movement of the puncher.

The principles of the present invention may be applied to particular advantage when used in combination with a sensor and a controller. The sensor would detect when the puncher has completed a full cycle of the cyclic movement. Automation of the marking process is advantageously carried out by the controller. When the puncher is over the predetermined location of the slide, the controller receives a trigger signal to begin the tamping process. The controller then sends a marking initiation signal to the motor. The motor upon reception of this signal advances an unused section of the marking medium over the predetermined location. The motor also turns the shaft which in turn actuates the cyclic movement of the puncher. When the puncher has made the mark at the predetermined location of the slide by completing the cyclic movement, one of the sensors detects and notifies the controller of this completion. The controller then sends a marking termination signal to the motor to terminate the movement of the shaft and in turn the movement of the puncher.

Additionally, the principles of the present invention may be applied to particular advantage when used in combination with a supply spool carrying a roll of unused marking medium and a takeup spool carrying a roll of used marking medium. A section of the unused marking medium is fed into a throat between a puncher guide and a cutting die before the start of the cyclic movement of the puncher from the supply spool. After that section of marking medium is used for the marking by the puncher onto the predetermined location of the slide, that section is spooled out of the throat into the takeup spool. The supply spool and the takeup spool can advantageously be part of a marking medium cartridge for easy handling.

In a further aspect of the present invention, a sensor detects when the roll of unused marking medium has diminished to a sufficiently low level. At that point, the controller may warn the user to replace the roll of unused marking medium with a new roll of unused marking medium.

These and other features and advantages of the present invention will be better understood by considering the following detailed description of the invention which is presented with the attached figures.

DESCRIPTION OF THE PREFERRED EMBODIMENT

Figure 1:
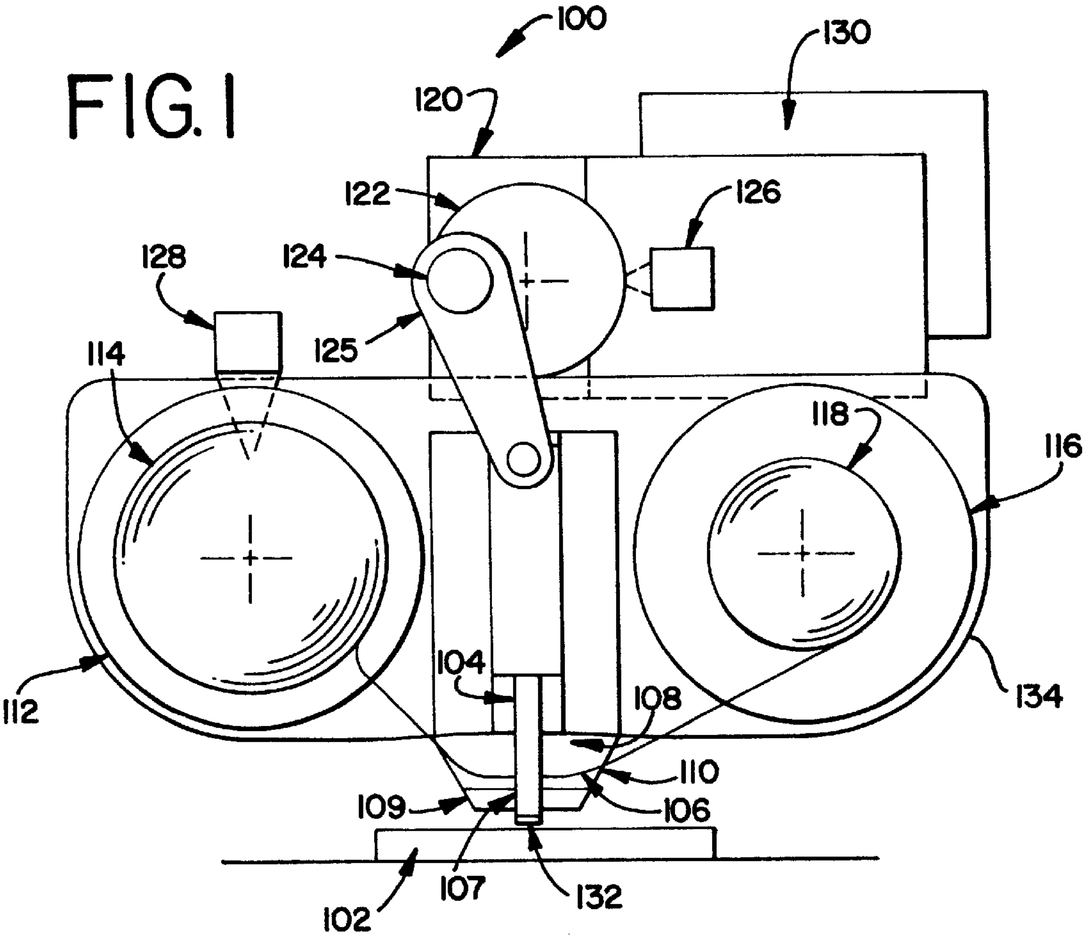
FIG. 1 shows a preferred embodiment of the slide marker of the present invention.

FIG. 1 shows a preferred embodiment of the slide marker 100 of the present invention for making a mark onto a predetermined location of the slide 102. The slide contains an image to be viewed via a magnification viewing system.

The slide marker 100 includes a puncher 104 and a section of a marking medium 106 that is disposed within a throat 110 which includes a space between a puncher guide 108 and a cutting die 109. The puncher has a punching surface 107. The puncher guide carries the puncher directly over a hole, within the cutting die, which is disposed over the predetermined location of the slide where the mark is to be made. The marking medium is threaded into the throat.

A supply spool 112 carries a first roll 114 of unused marking medium, and a takeup spool 116 carries a second roll 118 of used marking medium. The supply spool advances unused sections of the marking medium into the throat 110 from the first roll of unused marking medium, and the takeup spool takes in used sections of the marking medium from the throat to the second roll of the used marking medium. A motor 120 turns the takeup spool in order to replace a used section of the marking medium with an unused section within the throat.

The motor 120 is also operatively connected to a shaft 122 to generate a rotational movement of the shaft. An eccentric post 124, operatively connects the shaft to a link 125 which is operatively connected to the puncher 104. The eccentric post and the link translate the periodic rotational movement of the shaft into a cyclic movement of the puncher.

A first sensor 126 is disposed adjacent to the shaft 122 to detect the movement of the shaft. A second sensor 128 is disposed to detect the supply level of unused marking medium in the first roll of unused marking medium 114. An electronic controller 130 is operatively connected to the first sensor, the second sensor, and the motor to control the operation of the slide marker 100.

The operation of the slide marker 100 is now described. The slide marker 100 is coupled to a magnifying viewing system that provides a magnified image of the slide 102. A user of the slide marker while viewing the magnified image would select predetermined locations on the slide that the user wants to be marked.

For example, in the AcCell™ Automated Cytology Work Station from AccuMed International, Inc. a cytologist with a cross hair marker and a mouse can select the predetermined locations on the slide that the user wants to be marked as the cytologist views the slide. Alternatively, such a viewing systems can include a computer screen with a mouse pointer for selecting the critical features on the image along with the corresponding predetermined locations on the slide to be marked.

Once all of the predetermined locations on the slide to be marked has been designated by the user, the slide marker 100 is also coupled to a locating system that can place the puncher 104 of the slide marker directly over a predetermined location that the user has specified for marking.

Such a locating system would typically include a host controller which would send a trigger signal to the controller 130 of the slide marker indicating that the puncher has been placed directly over a predetermined location of the slide for marking. The viewing system and the locating system are common in the prior art, and the operation of the slide marker is initiated upon reception of the trigger signal from the host controller of the locating system. An example of such a viewing and locating system is the AcCell™ Automated Cytology Work Station from AccuMed Internation, Inc.

When the controller 130 receives a trigger signal from the host controller, the controller sends a marking initiation signal to the motor 120. Upon reception of this marking initiation signal, the motor generates a rotational movement of the shaft 122. The eccentric post 124 and the link 125 which are operatively connected between the shaft and the puncher 104 translate the rotational movement of the shaft into the cyclic movement of the puncher.

This cyclic movement of the puncher includes the puncher starting at a first position. In the slide marker 100 of FIG. 1, that first position would be the top most position. Then, the puncher moves down toward a second position where the punching surface 107 of the puncher would substantially touch the predetermined location on the slide. The cyclic movement of the puncher ends when the puncher moves back substantially to the first position from the second position.

At that point, the first sensor 126 detects that the puncher has moved a full cycle, and indicates that condition to the controller 130. The first sensor for example can be an infrared detector and would detect when the shaft has rotated a full cycle. The controller then sends a marking termination signal to the motor to terminate the rotational movement of the shaft 122 which in turn terminates the movement of the puncher 104.

The mark onto the predetermined location of the slide in the slide marker 100 is made during the cycle of movement of the puncher when the puncher is coming down from the first position to the second position. As the puncher goes down, the puncher pushes an unused section of the marking medium within the throat 110 through the cutting die 109 which cuts a punched through portion 132 of the marking medium. The puncher carries that punched through portion of the marking medium on the punching surface 107 of the puncher. When the puncher reaches the second position where the punching surface substantially touches the slide, the punched through portion of the marking medium is tamped onto the predetermined location of the slide.

Figure 2:
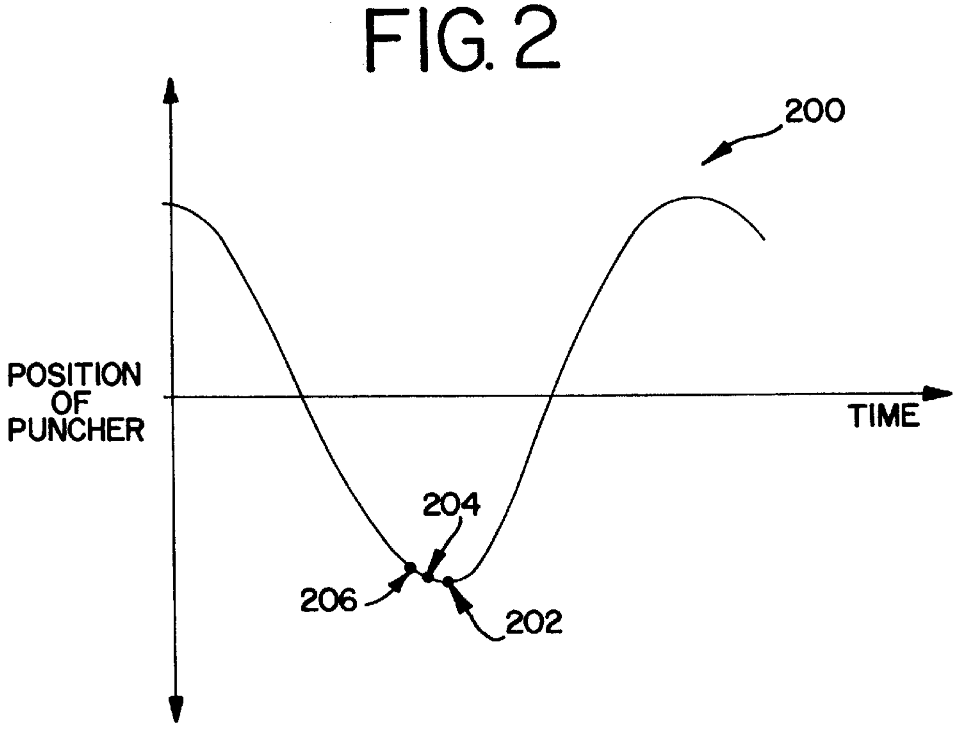
FIG. 2 shows a graph of the position of a puncher in the slide marker of the present invention as a function of time if no slide were to stop the movement of the puncher during the cyclic movement of the puncher.

With the cyclic movement of the puncher, a graph 200 in FIG. 2 of the position of the puncher with time would be sinusoidal if the slide were not below the puncher. With a slide below the puncher, the second position of the puncher when the punching surface makes contact with the slide is near a point 202 on the curve where the derivative of the curve at that point would be zero.

The exact location of the second position on the curve depends on the thickness of the slide. For example, referring to FIG. 2, the derivative at a point 202 on the curve is zero. Then the second position of the puncher for a thinner slide would be at a point 204 while the second position of the puncher for a thicker slide would be at a point 206. This condition is because the puncher would extend further down for a thinner slide than for a thicker slide. In either case, since both points 204 and 206 are near the zero derivative point 202, the punching surface tamps the marking medium onto the slide with near zero contact velocity.

In addition, the slide marker mechanism 100 is suspended in a free vertical slide member in order to allow for variations in the thickness of the slide 102. When the punching surface of the puncher makes contact with the upper surface of the slide, the free vertical slide member allows the slide marker mechanism to recoil back from the slide.

Thus, independent of the thickness of the slide 102, the puncher 104 can stop after the punching surface (via the marking medium) makes contact with the upper surface of the slide. In this manner, the tamping force when the punching surface tamps the marking medium onto the slide is a function of the mass and the counterbalanced weight of the slide marker mechanism 100. This tamping force with the near zero contact velocity is especially amenable for preventing damage to the slide particularly when a friable glass slide is used.

The marking medium has a contact surface with a pressure sensitive adhesive facing the slide. With such an adhesive, the punched through portion of the marking medium can be secured to the predetermined location of the slide. The marking medium can be a nonvolatile tinted plastic medium such as a tinted polyester film stock that is 0.025 millimeters thick.

Note that such a marking medium is a dry marking medium, and a dry cycle, as is commonly needed in the prior art, to further ensure that the mark will remain at the predetermined location of the slide would not be needed. Furthermore, such a dry marking medium is not as volatile as a wet marking medium and can last a longer period of time within the slide marker mechanism. For each full cycle of movement of the puncher, an unused section of the marking medium is advanced into the throat 110. After the section of the marking medium that is within the throat has been used to make the mark, that section is spooled out of the throat and into the second roll 118 of the used marking medium.

In the slide marker 100 of FIG. 1, when the motor 120 receives the marking initiation signal at the start of the marking cycle, the motor turns the takeup spool 116. In this manner, the priorly used section of the marking medium within the throat is spooled out of the throat and onto the second roll of the used marking medium, and a section of the unused marking medium is fed into the throat before the punching surface 107 reaches the marking media within the throat.

The supply spool 112 and the takeup spool 116 of marking media can be within an easy to handle marking medium cartridge 134. This cartridge could then be snapped into the slide mechanism 100 for easy handling of the marking medium.

The second sensor 128 monitors the supply level of the first roll of unused marking medium and detects when the supply level reaches a predetermined low level. Upon such a detection by this sensor, the controller warns a user to replace the first roll of unused marking medium with a new roll of unused marking medium. With the supply spool 112 and the takeup spool 116 of marking media within a marking medium cartridge, an old cartridge of marking medium having the first roll of unused marking medium can be easily replaced with a new cartridge having the new roll of unused marking medium.

Thus, operation of the slide marker 100 of the present invention automates the process of making a mark onto a predetermined location on a slide by the use of sensors and a controller. In this manner, the marking process of the present invention can be faster and more accurate than those of the prior art. Additionally, use of a dry marking medium can eliminate the need for a dry cycle as can be required by the messier wet marking system of the prior art and can eliminate the waste that can arise when a volatile wet marking medium dries up within the slide marking system.

The advantages of the invention described herein can be generalized to implementation of the slide marker with any apparatus and method for tamping any dry marking medium onto the slide with near zero contact velocity. Accordingly, the forgoing description is by way of example only and is not intended to be limiting. The invention is limited only as defined in the following claims and equivalents thereof.

What is claimed is:

1. A method for making a mark at a predetermined location of a slide, said method including, in combination, the steps of:

A. moving a puncher in a cycle from a first position to a second position and back to said first position, wherein said puncher has a punching surface which makes contact with said slide with a tamping force low enough to prevent damage to said slide when said puncher is at said second position;

B. advancing an unused section of a marking medium, between said punching surface of said puncher and said predetermined location of said slide, wherein said marking medium has a contact surface with a pressure sensitive adhesive facing said slide; and C. tamping said marking medium onto said predetermined location of said slide with said punching surface of said puncher when said puncher is at said second position, to make said mark.

2. A method of making a mark as recited in claim 1, wherein said tamping force is a function of a mass and a counterbalanced weight of a slide marker mechanism carrying said puncher.

3. A method of making a mark at a predetermined location on a slide, said method comprising, in combination, the steps of:

moving a puncher in a cycle from a first position to a second position and back to said first position by a process comprising (i) generating a rotational movement of a shaft by use of a motor and (ii) translating said rotational movement of said shaft to cyclic movement of said puncher, wherein said puncher has a punching surface, and, when said puncher is at said second position, said punching surface contacts said slide with a tamping force low enough to prevent damage to said slide;

advancing an unused section of a marking medium, between said punching surface of said puncher and said predetermined location of said slide, wherein said marking medium has a contact surface with a pressure sensitive adhesive facing said slide; and tamping said marking medium onto said predetermined location of said slide with said punching surface of said puncher when said puncher is at said second position, to make said mark.

4. A method of making said mark as recited in claim 3, wherein said marking medium is a dry marking medium that does not require a dry cycle.

5. A method of making said mark as recited in claim 4, wherein said dry marking medium is a nonvolatile tinted polyester film stock.

6. A method of making said mark as recited in claim 3, further including, in combination, the steps of:

receiving a trigger signal indicating that said puncher is over said predetermined location of said slide;

sending a marking initiation signal to said motor upon reception of said trigger signal instructing said motor to generate said rotational movement of said shaft;

detecting when said puncher has completed a full cycle of said cyclic movement of said puncher; and sending a marking termination signal to said motor instructing said motor to terminate said rotational movement of said shaft when said full cycle of said cyclic movement of said puncher is complete.

7. A method of making said mark as recited in claim 3, wherein said step of advancing includes, in combination, the steps of:

spooling out a section of a marking medium from a first roll of unused marking medium into a throat including a space between a cutting die having a hole over said predetermined location of said slide and a puncher guide that carries said puncher over said hole of said cutting die; and spooling in said section of marking medium to a second roll of used marking medium from said throat after said section of marking medium has been used by said puncher to tamp said mark from said section of marking medium.

8. A method of making said mark as recited in claim 7, further including in combination, the steps of:

detecting when said first roll of said unused marking medium has diminished to a predetermined low level; and warning a user to replace said first roll of said unused marking medium with a new roll of unused marking medium when said first roll has diminished to said predetermined low level.

9. A slide marker for marking a mark at a predetermined location of a slide, said marker comprising, in combination:

a puncher that moves in a cycle from a first position to a second position and back to said first position, wherein said puncher has a punching surface, and, when said puncher is at said second position, said punching surface makes contact with said slide with a tamping force low enough to prevent damage to said slide;

a marking medium, disposed between said punching surface of said puncher and said predetermined location of said slide, and having a contact surface with a pressure sensitive adhesive facing said slide, wherein said mark is made by said punching surface tamping said marking medium onto said predetermined location of said slide when said puncher is at said second position;

a motor for generating a rotational movement of a shaft; and an eccentric post and link mechanism, operatively connected between said shaft and said puncher, for translating said rotational movement of said shaft to said cyclic movement of said puncher.

10. A slide marker for marking a mark at a predetermined location of a slide, said marker comprising, in combination:

a puncher that, when positioned over said predetermined location of said slide, moves in a cycle from a first position to a second position and back to said first position, said puncher having a punching surface that makes contact with said slide with a tamping force when said puncher is at said second position, said tamping force being low enough to prevent damage to said slide;

a marking medium, disposed between said punching surface of said puncher and said predetermined location of said slide, and having a contact surface with a pressure sensitive adhesive facing said slide, wherein said mark is made by said punching surface tamping said marking medium onto said predetermined location of said slide when said puncher is at said second position;

a motor for generating a rotational movement of a shaft; and an eccentric post and link mechanism, operatively connected between said shaft and said puncher, for translating said rotational movement of said shaft to said cyclic movement of said puncher.

11. A slide marker of claim 10, further comprising, in combination:

a sensor for detecting when said puncher has completed a full cycle of said cyclic movement of said puncher; and a controller, operatively connected to said sensor and said motor, for providing a marking initiation signal to said motor when said puncher is over said predetermined location of said slide, wherein said motor generates said rotational movement of said shaft upon reception of said marking initiation signal, and wherein said controller provides a marking termination signal to said motor such that said motor terminates said rotational movement of said shaft when said sensor detects that said puncher has completed said full cycle.

12. A slide marker of claim 11, wherein said marking medium is a dry marking medium that does not require a dry cycle.

13. A slide marker of claim 12, wherein said dry marking medium is a nonvolatile tinted polyester film stock.

14. A slide marker of claim 10, further comprising, in combination:

a supply spool having a first roll of unused marking medium;

a throat that includes a space between a cutting die having a hole over said predetermined location of said slide and a puncher guide that carries said puncher over said hole of said cutting die, wherein a section of said unused marking medium from said first roll is fed into said throat; and an uptake spool, having a second roll of used marking medium, comprising said section of marking medium from said first roll that has been within said throat and that has been used by said puncher to tamp said mark from said section of marking medium.

15. A slide marker of claim 14, wherein said supply spool and said uptake spool are within a marking medium cartridge.

16. A slide marker of claim 14, further comprising, in combination:

a motor for turning said uptake spool before a start of said cyclic movement of said puncher such that said uptake spool takes in said section of marking medium within said throat to said second roll and such that said supply spool feeds in an unused section of said marking medium from said first roll into said throat.

17. A slide marker of claim 14, further comprising, in combination:

a sensor for detecting when said first roll of said unused marking medium has diminished to a predetermined low level; and a controller, operatively connected to said sensor, for warning a user to replace said first roll of said unused marking medium with a new roll of unused marking medium when said first roll has diminished to said predetermined low level.

18. A slide marker of claim 17 wherein said first roll of unused marking medium is within a used marking medium cartridge and wherein said user replaces said used marking medium cartridge with a new marking medium cartridge having said new roll of unused marking medium.

19. A slide marker as claimed in claim 10, wherein said marking medium is a dry marking medium that does not require a dry cycle.

20. A slide marker as claimed in claim 19, wherein said dry marking medium is a nonvolatile tinted polyester film stock.

21. A slide marker for making a mark at a predetermined location of a slide, said marker comprising, in combination:

a puncher, that when positioned over said predetermined location of said slide moves in a cycle from a first position to a second position and back to said first position, wherein said puncher has a punching surface which makes contact with said slide with a tamping force low enough to prevent damage to said slide when said puncher is at said second position;

a supply spool having a first roll of unused dry marking medium;

a throat including a space between a cutting die having a hole over said predetermined location of said slide and a puncher guide that carries said puncher over said hole of said cutting die, wherein a section of dry marking medium from said first roll of unused dry marking medium is fed into said throat, and wherein said dry marking medium has a contact surface with a pressure sensitive adhesive facing said slide, and wherein said mark is made by said punching surface tamping said dry marking medium onto said predetermined location of said slide;

an uptake spool, having a second roll of used dry marking medium, comprising said section of dry marking medium from said first roll that has been within said throat and that has been used by said puncher to tamp said mark from said section of dry marking medium;

a motor for generating a rotational movement of a shaft and for turning said uptake spool before a start of said cyclic movement of said puncher such that said uptake spool takes in said section of dry marking medium within said throat to said second roll and such that said supply spool feeds in an unused section of said dry marking medium from said first roll into said throat;

an eccentric post and link mechanism, operatively connected between said shaft and said puncher, for translating said rotational movement of said shaft to said cyclic movement of said puncher;

a first sensor for detecting when said puncher has completed a full cycle of said cyclic movement of said puncher;

a second sensor for detecting when said first roll of said unused dry marking medium has diminished to a predetermined low level; and a controller, operatively connected to said first sensor, said second sensor, and said motor, for providing a marking initiation signal to said motor when said puncher is over said predetermined location of said slide, wherein said motor generates said rotational movement of said shaft upon reception of said marking initiation signal, and wherein said controller provides a marking termination signal to said motor such that said motor terminates said rotational movement of said shaft when said first sensor detects that said puncher has completed said full cycle, and wherein said controller warns a user of said slide marker to replace said first roll of said unused dry marking medium with a new roll of unused dry marking medium when said first roll has diminished to said predetermined low level.

22. A slide marker of claim 21, wherein said dry marking medium is a nonvolatile tinted polyester film stock.

* * * * *